May 22, 1945.   H. R. FEHLING   2,376,479
INTERNAL-COMBUSTION ENGINE AND COMBUSTION MIXTURES THEREFOR
Filed Sept. 30, 1942   4 Sheets-Sheet 1
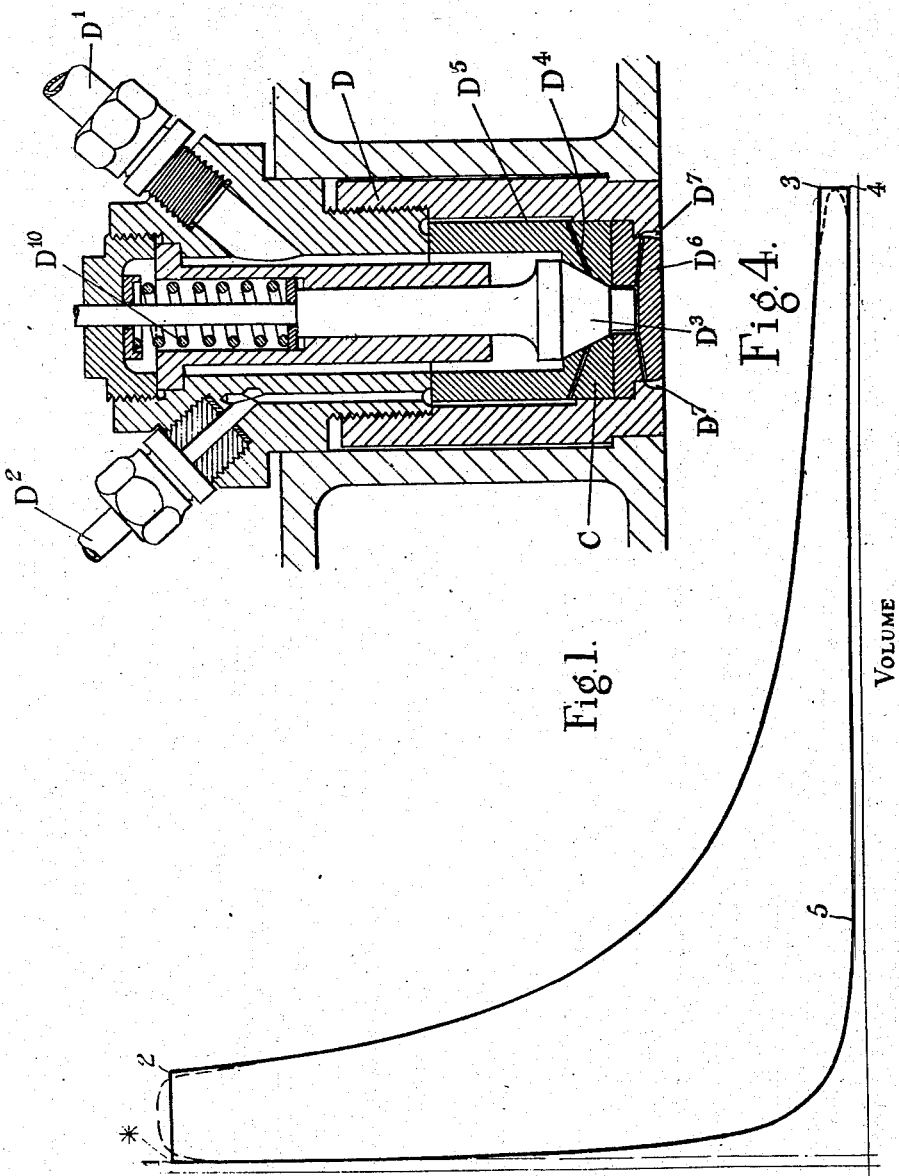
Inventor
H. R. Fehling
By Hascock Downing Seibold
Attys.

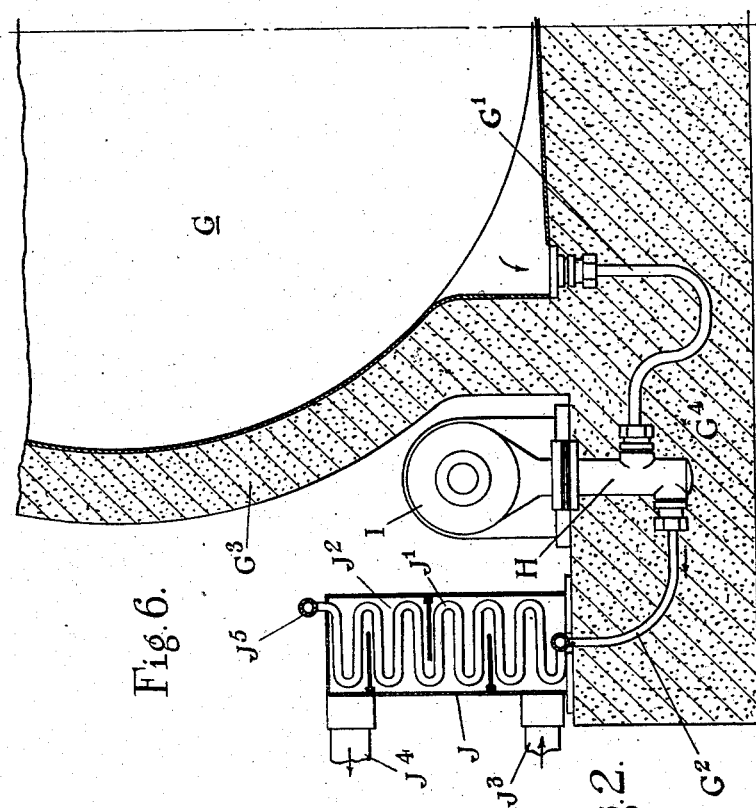
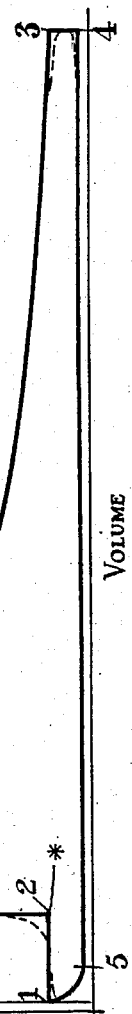

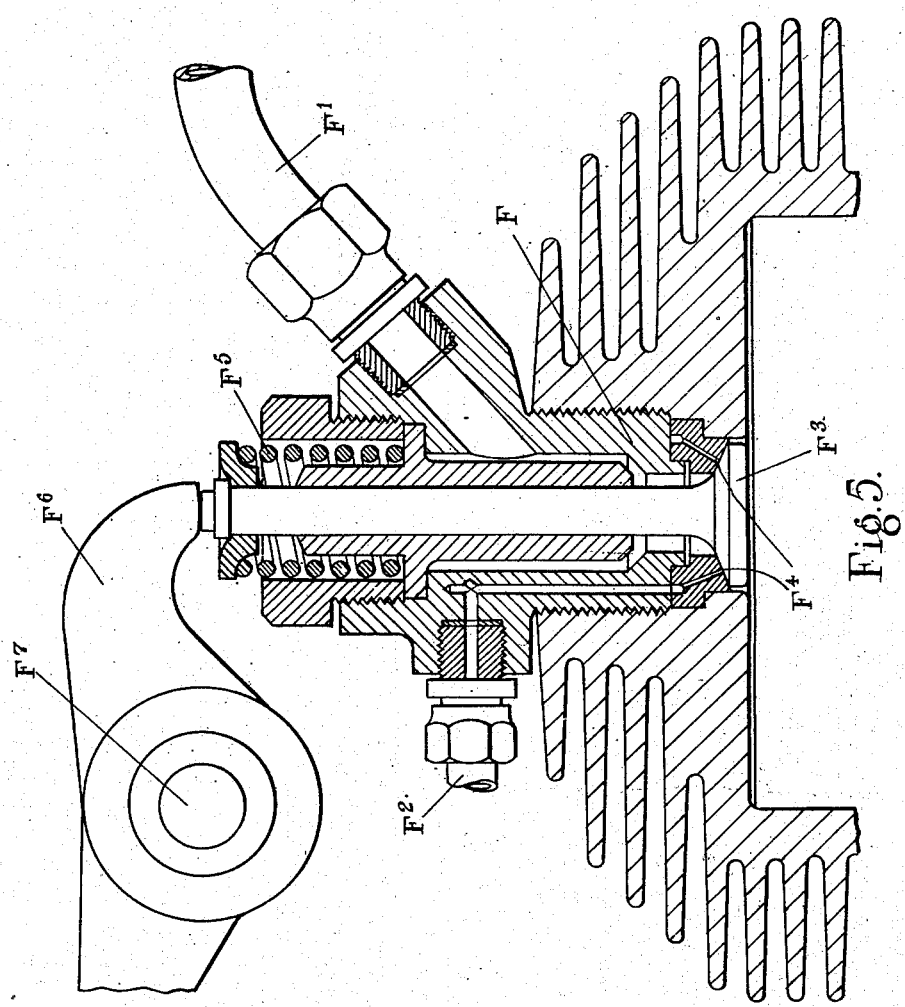

Patented May 22, 1945

2,376,479

UNITED STATES PATENT OFFICE 2,376,479

INTERNAL-COMBUSTION ENGINE AND COMBUSTION MIXTURE THEREFOR

Hans Reinhard Fehling, London, England

Application September 30, 1942, Serial No. 460,248
In Great Britain September 11, 1941

11 Claims. (Cl. 123—1)

This invention relates to internal combustion engines, to methods of operating such, and to the preparation and supply of combustion components for use in such engines, the invention being particularly concerned with the use of oxygen or oxygen-enriched air in internal combustion engines.

An object of the present invention is to increase the power output and thermal efficiency of internal combustion engines. A further object of the invention is to provide improvements adapted to make available a wider range of fuels for use in such engines.

The invention further aims at providing improvements which jointly or severally:

(a) Take advantage of the facilities afforded by combustion supporting agents hereinafter called "combustion agents" derived from a liquefied gas as against equivalent gaseous agents as subjected to compression in present-day engines.

(b) Provide an improved method of combustion and extraction of work from fuels by the aid of combustion agents derived from liquid oxygen or liquid oxygen-enriched air.

(c) Provide an internal combustion engine cycle adapted to the conditions imposed by the use of combustion agents derived from liquid oxygen or liquid oxygen-enriched air.

The invention consists in a method of operating an internal combustion engine comprising vaporizing a liquefied gas comprising upwards of about 30% free oxygen as a combustion agent, admitting fuel under pressure to a cylinder of the engine and admitting the vaporized combustion agent under pressure to the engine cylinder in an amount in relation to the fuel which on ignition effects substantially incomplete combustion producing as exhaust products mainly the diatomic gases carbon monoxide and hydrogen instead of the normal products of combustion of an internal combustion engine.

The invention also consists in a method of operating an internal combustion engine comprising vaporizing a liquefied gas comprising upwards of about 30% free oxygen for use as a combustion agent, admitting fuel under pressure to a cylinder of the engine and admitting the vaporized combustion agent under pressure to the engine cylinder when the piston is close to the inner end of its stroke in a cycle consisting of alternating power and exhaust strokes, the combustion agent being admitted in amounts in relation to the fuel which on ignition effect substantially incomplete combustion producing as exhaust products mainly the diatomic gases carbon monoxide and hydrogen instead of the normal products of combustion of an internal combustion engine.

Further features of the invention will be hereinafter described and defined in the claims.

Hereinafter in the specification the combustion according to the invention resulting in exhaust products composed mainly of the diatomic gases carbon monoxide and hydrogen will be referred to, as may be convenient, as "substantially incomplete combustion," and the phrase "oxygen or oxygen enriched air" may be conveniently employed in the specification hereinafter instead of "a liquefied gas comprising upwards of about 30% free oxygen."

While the combustion agent according to the invention it is to be understood includes mixtures in which oxygen is present in percentages upwards of 30%, from the practical point of view mixtures in which oxygen is present in not substantially less quantities than 40% are to be preferred.

The invention may be applied to engines operating on constant pressure or constant volume method of combustion.

The residual combustion products of engines operating according to the present invention for the operation of a secondary or subsidiary engine unit or element, or for chemical or industrial purposes, in conjunction with combustion air or oxygen in gaseous and/or liquid form, or for use with another gas or other gases or material or materials according to the purpose intended.

It is recognised that it has previously been proposed to employ oxygen in the actuation of internal combustion engines with a view supposedly to exploiting the very high concentration of energy in the combustible mixture. It has been found, however, that it is neither possible nor advantageous according to prior proposals to operate an engine with such a mixture owing to the extremely high temperatures, to the thermal properties of the working fluid (containing mainly the triatomic gases, carbon dioxide and water vapour) and to the high degree of dissociation which occurs at combustion temperatures. The complete combustion or explosion of liquid fuel with pure oxygen produces temperatures well over 3,500° C. Upwards of 40% of the carbon dioxide and 10% of the steam are dissociated at this temperature and at a maximum combustion pressure of about 1,000 lbs. per sq. in. For lower pressures the dissociation is still higher, and it varies a little according to the kind of fuel used. The thermal efficiency of oxygen-operated engines hitherto proposed is much lower at the same expansion ratios than with air as used in the ordinary way. In the present-day gasoline engine the thermal efficiency (excluding wall losses) is about 45% for an expansion ratio of 7:1 at correct mixture strength, i. e., for complete combustion. Under the same combustion conditions, but using oxygen the efficiency would be not more than 22%. Needless to say that apart from the bad efficiency such an engine would be unworkable because of the extreme temperatures obtaining in it. Even at very much higher expansion ratios the thermal efficiencies will hardly surpass the efficiencies hitherto obtained with ordinary air. For the same reason, the maximum power output obtainable without overheating will not be higher in oxygen-operated engines as hitherto proposed but will be lower than in engines operated with air used in the established manner.

It has also been previously proposed in engines such as those used for propelling submarines which carry a supporter of combustion (such as liquid oxygen) as well as a combustible fuel, to control the consumption of the supporter of combustion so that an excess of combustible fuel is supplied sufficient to secure complete consumption of the oxygen, in order to economise the oxygen supply. In order to avoid the difficulties of high temperatures inherent to the use of oxygen it was proposed to dilute the oxygen and fuel mixture with a proportion of the products of combustion. In this case it will be appreciated that the object of the proposed richer mixture was to conserve the limited oxygen supply and was not directed, as is the present invention, to a control calculated (inter alia) to produce serviceable lower combustion temperatures by effecting substantially incomplete combustion as herein defined.

According to the present invention it is proposed to circumvent the above difficulties attendant upon the use of oxygen, by the deliberate prohibition of the substantially complete combustion of the fuel content of the combustible mixture as referred to above by supplying only a fraction of the oxygen needed for the combustion conversion of the fuel to carbon dioxide and water vapour. The burnt mixture, as indicated earlier, thus contains mainly the diatomic gases, carbon monoxide and hydrogen ($H_2$), with or without nitrogen, which represent very good working substances mainly by virtue of their low specific heat. The reduced range of temperatures achieved by adopting the incomplete combustion method also ensures that dissociation is eliminated or reduced to a minimum. As a consequence of the above procedure by far the greater part of the heat generated by combustion is available for conversion into useful work. At an expansion ratio of 10:1, corresponding to a very high power output, about 60% of the heat generated is converted into work. For normal power the expansion ratio would be increased, for example, to 20:1 by earlier closing of the inlet valve or nozzle, and the efficiency would rise to 70%. Under idling conditions it would be possible to expand a very small charge by as much as 50:1 and in this case the efficiency would be over 80%. The improved engine is cooler than engines using ordinary air at the same expansion ratio and affords a much higher power output per swept cylinder volume.

While the combustion or explosion temperature would be of the same order as in the present-day engines using air, the expansion temperatures, which are the real criterion for the thermal stress imposed upon the engines, are much lower. The present-day Diesel engine with a compression ratio of 12:1 has at full power an expansion temperature of about 1,400° C. The improved engine, operated with oxygen and substantially incomplete combustion, has an expansion temperature of about 1,100° C. for an expansion of 10:1 and of about 850° C. for an expansion of 20:1. All these temperatures take into account the real properties of the working substance but not the heat losses through cylinder walls which vary according to the size and type of engine. Compared with the present-day gasoline engine the drop in temperature is even more pronounced. It will also be appreciated that the consumption of oxygen will be lessened and this, together with the high expansion ratios that can be obtained in the improved engine, will under appropriate conditions decrease the consumption of the fuel mixture below the consumption figures hitherto achieved for the same performance.

The substantially incomplete combustion of fuel and the exhaustion of unburnt gases do not result in waste, as the residual gases are available for employment in performing useful work.

Figure 1 is a diagram of the pressure volume cycle of a constant pressure type engine according to the invention, while Figure 2 is a diagram of the pressure volume cycle of a constant volume type engine according to the invention.

Figure 4 is a sectional elevation of the injector nozzle device indicated in external elevation at the outer end of the cylinder in Figure 3.

Figure 5 is a cross section of the head and outer end of a cylinder of an engine for operating upon the constant volume method according to the invention, and illustrating an appropriate type of injection valve arrangement, and Figure 6 is a sectional view diagrammatically illustrating part of a reservoir, a compression pump and a heat exchange coil for supplying vaporized combustion agent.

Figure 3:
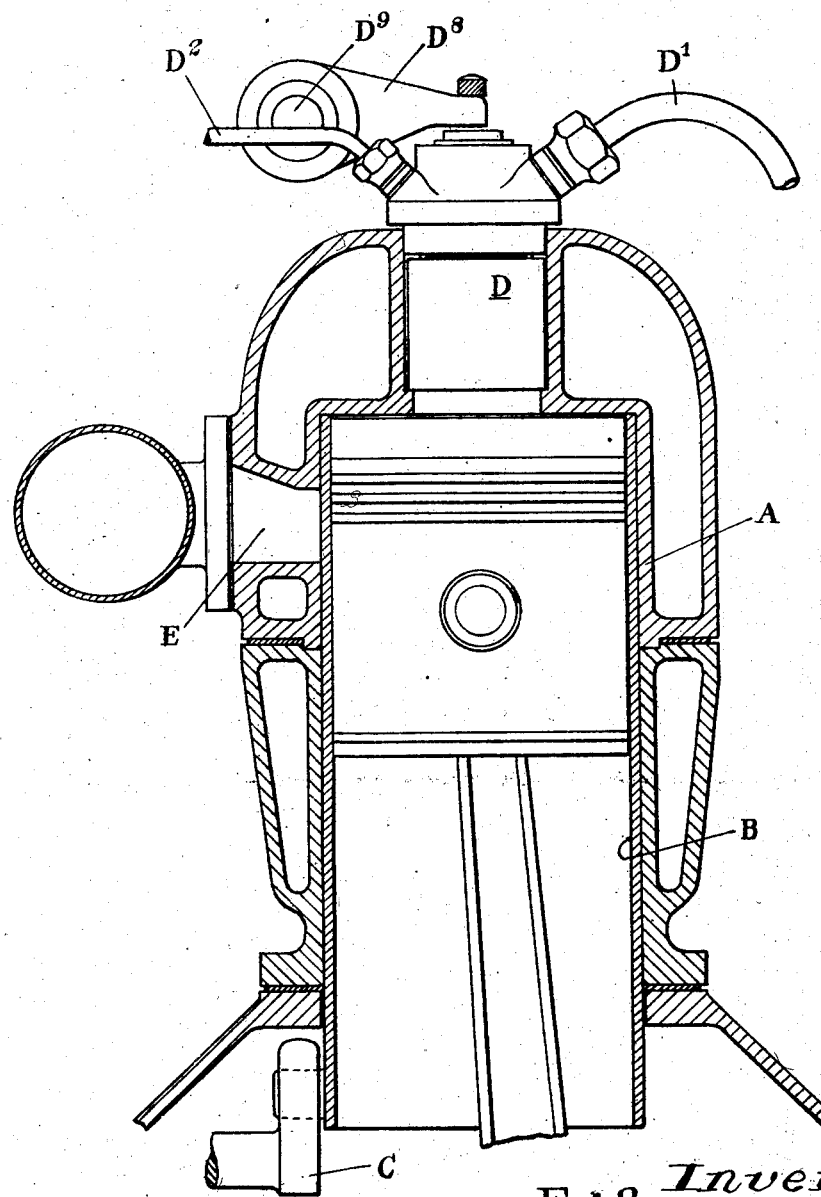
Figure 3 is a part sectional elevation of an engine showing the piston and cylinder designed to exemplify the improved cycle.

In carrying the invention into effect the combustion agent is made available in the liquid state either by liquefying the agent in a plant associated with the engines in which the agent is to be used or by using such from suitably insulated storage containers.

The liquid agent is vaporized by pumping such into a vaporizer maintained at a predetermined pressure (or pressure range) and at an appropriate temperature (or temperature range).

In the case of the constant pressure method of combustion the vaporizer pressure is equal to (or in view of pressure losses on the way) slightly higher than, the maximum cylinder pressure at which the engine is designed to work. This pressure may vary between 600 and 1,000 lbs. per sq. in. and is determined according to considerations of weight and type of engine such as are familiar to those skilled in the art.

Should it be required to regulate the engine power by varying the maximum cylinder pressure it may be found convenient to keep the vaporizer pressure constant at high level (e. g., at, or higher than, the critical pressure) and to throttle the oxygen before entry into the cylinder. However, the vaporizer pressure must under all circumstances be at least equal to the maximum cylinder pressure. When using the constant pressure method of combustion the liquid agent is vaporized at critical or super-critical pressures, for example liquid oxygen may be pumped into the vaporizer at a pressure of about 750 lbs. per sq. inch or more, such that the transfer from the liquid into the gaseous state is continuous without any break or interface between the phases.

When the liquid agent is produced in a plant associated with the engine the cold content of the liquid pumped into the vaporizer, as well as part of the power subsequently generated, may advantageously be used in the production of fresh liquid agent. For example, quantities of the agent in gaseous form may be caused to pass in heat transference relationship with the liquid agent during vaporization and utilised to provide desirable temperature conditions while the cooled gaseous agent is subsequently supplied to the liquefying pressure plant, which may be driven or in part driven by power supplied from the engine (or engines) to which the vaporized combustion agent or its products are supplied.

The appropriate temperature for the combustion agent will be mainly governed by the kind of fuel used. In the case of gasoline which ignites easily the temperature need not be higher than that of the surroundings. With heavier fuel it will be more convenient to increase the temperature to 100° C. or more. Only in the case where the ignition itself is to be effected by contact with the hot combustion agent as referred to hereinafter, is it requisite that the agent should be preheated to upwards of 350° C., depending on the kind of fuel.

The vaporized combustion agent is supplied from the vaporizer under pressure to the internal combustion engine through a suitable valve or injection nozzle device. Where admission is effected through a valve any suitable known form of valve may be employed but it is preferred to employ a valve of the sleeve-valve type. Where a nozzle is employed it is preferred to employ one of the type in which the injection valve is controlled mechanically.

The fuel is injected at the same time as the entry of the combustion agent and may be either in liquid form or vaporized under pressure in a vaporizer and supplied to the cylinder through a suitable valve or nozzle. There may be cases, as for example with engines running on heavy fuels or at high speeds, when it may be advantageous to allow the mixture of fuel and combustion agent to be effected immediately before entering the clearance between the piston and the cylinder head. On the other hand, separate inlets for the fuel and the combustion agent may be provided and so arranged that a reliable and complete mixture or combustion relationship is effected at the point of entry in the combustion clearance.

As the preferred engine is devised to operate on the improved cycle comprising power strokes alternating with exhaust strokes the combustion chamber proper, such as is found in present-day engines, is absent and substituted by a clearance sufficient for operating according to the cycle and the conditions described below.

It is obvious that for mechanical reasons there must be a certain clearance between piston crown and cylinder head. In small engines manufactured with great precision, this clearance might be reduced to less than $\tfrac{1}{16}$ inch (measured axially) while in larger engine cylinders it might be more than $\tfrac{1}{8}$ inch. As a rule it will be possible to bring down the unswept cylinder volume at top dead centre to 1% of the total cylinder volume. This is, however, only required where it is intended to make use of extremely high expansion ratios of, say, 50:1 and more. Where, however, the expansion ratio is not to exceed 30:1 even at low loads, there is no necessity for a clearance volume of less than 2 per cent.

The combustion of the mixture during the power stroke, according to the constant pressure method conditions, is arranged so that fuel ignites as soon as it enters the cylinder and burns continuously at about constant pressure without the cylinder being filled at any moment with any appreciable amount of unignited combustible mixture.

In Figure 1 a theoretical pressure/volume diagram is shown of an example of the improved cycle for a constant pressure type engine, the full lines indicating the ideal form while the dotted lines give an approximation to an indicator diagram form.

Ignition is indicated by the asterisk. Points 1—2 cover the period of substantially constant pressure. At 2 the inlet is cut off and from 2—3 expansion and power stroke proceeds. Exhaust takes place from 4—5, the exhaust valve closing at 5, while from 5 to 1 recompression of exhaust gas is effected.

In the constant volume method the conditions of the combustion agent are so adjusted that the temperature and pressure at entry are such as to prohibit ignition of the fuel before the inlet valve has closed and the desired crank angle has been reached. The charge is fired by spark ignition at the appropriate moment and combustion proceeds at about constant volume in much the same way as in the present-day gasoline or gas engine with spark ignition.

Figure 2 shows a theoretical pressure/volume diagram of an example of the improved cycle for a constant volume type engine. As in Figure 1 the full lines illustrate the ideal curve while the dotted lines give an approximation to an indicator diagram form.

Ignition is indicated by the asterisk. At 1 the inlet valve opens. From 1 to 2 the cylinder receives the combustible mixture. From 2—2′ the explosion pressure rise is shown. Expansion and power stroke is represented from 2′—3. The exhaust stroke proceeds from 4—5 while from 5—1 there is recompression of residual exhaust products.

According to both the constant pressure and constant volume methods of operation the charge weight supplied to the engine is controlled by the thermodynamic state of the combustion agent entering the cylinder and/or by timing the operation of the inlet valve or nozzle.

In an engine operating according to the constant volume method the pressure and temperature of the non-ignited charge are so adjusted that the charge weight per cycle is correct for the power required, and that the explosion pressure does not exceed the pressure limit for which the engine is designed. If, for example, the engine is built for a maximum cylinder pressure of 1,000 lbs. per sq. inch the charge pressure P lb./sq. in. and its temperature T °C. absolute, have to be so adjusted that $P/T = 0.11$ to $0.14$.

In the case of gasoline, for example, the temperature of the ingoing charge may be 20° C.

and its pressure would have to be equal to, or less than, 40 lbs./sq. in. If the highest permissible cylinder pressure is less than 1,000 lbs. the above P/T-ratio is to be decreased in proportion.

After ignition the combustion gases expand throughout the power stroke and at the termination thereof the exhaust port opens and on the return stroke the piston scavenges the cylinder and pushes out the exhaust gases through the exhaust port.

It will be appreciated that although the engine operates on a two-stroke cycle it does not function according to the known two-stroke cycle as there is no induction stroke or scavenging of the exhaust by the inlet gases.

By virtue of the power-exhaust stroke cycle the expansion ratio for the engine is completely independent of the usual compression ratio and of the state of the charge or conditions of the cylinder prior to ignition. The expansion ratio can be varied as required in the design of the engine from very low ratios for the production of high power output up to very high ratios employing small charges in order to provide conditions of maximum thermal efficiency.

Owing to the fact that, with the constant pressure method, the cylinder is not filled at any moment with any appreciable amount of non-ignited combustible mixture, any kind of detonation or sudden pressure rise is prevented and the pressure and temperature of the entering charge can be so chosen as best to suit the particular fuel employed, taking into consideration its chemical reactivity and its thermal properties etc. With the constant volume method detonation can be prevented without sacrificing the advantages of a high expansion ratio by controlling pressures and temperatures of the charge.

It has already been mentioned above that in the case of the constant volume cycle a certain pressure-temperature ratio has to be maintained, and that for a maximum cylinder pressure of 1,000 lbs. this ratio was of the order of 0.11 to 0.14. It is, therefore, possible to keep the ratio within the prescribed limits by using low temperatures and pressures of, for example, 0° C. and 35 lbs. in order to prevent pre-ignition and detonation.

As indicated, the cycle and method of introduction of the charge make a combustion chamber as such unnecessary. The provision of such chamber would, on the contrary, reduce the maximum expansion ratio which would be otherwise obtainable. For practical reasons, however, there will always be a small volume unswept by the piston when such arrives at the top dead centre.

The volume or clearance left between the piston crown and the cylinder may be employed for the compression of a proportion of the residual exhaust gases at the end of the exhaust stroke by, for example, closing the exhaust port at a predetermined crank angle before top dead centre. If, for example, the pressure of the residual exhaust by the above compression method is raised to or nearly to the pressure of the vaporized combustion agent, there would be no or only a little difference in pressure between the vaporizer pressure and that in the cylinder when the inlet opens. Consequently, the amount of combustion agent entering the cylinder would in this case be governed entirely by the volume swept by the piston between the opening and closing of the inlet.

As indicated the piston clearance may be employed for the compression of part of the residual exhaust (see indicator diagrams Figures 1 and 2) to prevent a sudden pressure rise. It will be appreciated that the degree to which the exhaust should be recompressed for this purpose depends on the size of engine, its speed, and particularly to the distribution of inertia forces exercising upon the reciprocating parts near the top dead centre. However, as a general guide the following figures may be given:

The exhaust valve is to close when the piston has reached a point where the residual volume is $x$ times the clearance volume at top dead centre—

For the constant pressure cycle $x=15$ to $25$
For the constant volume cycle $x=2$ to $4$ With a clearance volume of 1 per cent. the exhaust valve is therefore to close At 40 to 50 degrees of crank angle before top dead centre for the constant pressure cycle;
At 15 to 20 degrees of crank angle before top dead centre for the constant volume cycle.

The advantages of compressing a residual charge would be to prevent a sudden pressure rise at the top dead centre when the inlet opens and to avoid the mechanical defects arising from fluctuations of maximum pressure which might otherwise be met. At the same time the process of ignition (in the constant pressure method) of the entering charge close to the inlet is greatly facilitated as in the first place the temperature of the residual exhaust is very much increased by compression, for example it may be in the neighbourhood of 1,200–1,400° C., thus affording a means of assisting in ignition of the charge at the moment of entry. Furthermore, if there were the full pressure difference between vaporizer and exhaust pressure at the point of entry of the charge when the inlet opens, the charge would blow into the cylinder at very great velocity and probably would not ignite at the point of entry. The delayed ignition would then lead to a sudden explosion with all the unsatisfactory consequences arising therefrom.

Another method of effecting or assisting ignition, which may be used in connection with or independently of the method just described of compressing a residual charge, is to preheat the combustion agent to a temperature sufficient to ensure immediate ignition when the agent is brought into contact with the fuel, although it is thought that this will be effected in any case without preheating of the agent at or before entry.

A further method of ignition applicable to the constant pressure cycle, is to arrange the inlet of fuel and combustion agent in such a position that they come into contact with a hot spot or surface.

The choice of combustion agent, that is to say whether pure oxygen or oxygen-enriched air is used, will depend on the purposes for which the engine is intended. In cases where the agent is not produced in connection with the power plant but supplied to it from containers or reservoirs, it may be found advantageous to use pure or nearly pure oxygen in order to save weight.

The accompanying drawings, Figures 3–5, are intended to exemplify the improved cycle and method, and indicate arrangements for carrying the invention into effect without attempting to illustrate any hard and fast design. Figure 3 is a cross-sectional elevation of the cylinder and a fragment of the crankcase of an engine of the constant pressure type for operating upon the power-exhaust stroke cycle according to the invention. The cylinder A is fitted with a sleeve valve B which is given an operational displacement such that a point thereon moves in an elliptical path, motion being communicated by the crank C driven by any suitable gearing at the same speed as the crankshaft. In the cylinder head an injection nozzle device D of any suitable known type is provided, an example of which is shown in cross section in Figure 4. Vaporized combustion agent enters the device by the pipe $D^1$ while the fuel is introduced through the pipe $D^2$. An inlet injection valve $D^3$ controls the emission of the combustion agent and fuel, the latter being admitted to the valve seat through ducts $D^4$ which communicate with the supply at $D^2$ through clearance $D^5$. An atomiser plate $D^6$ is provided across the valve opening and positioned to afford an annular clearance $D^7$ where ignition takes place. The valve is mechanically operated by a lever $D^8$ of a rock shaft $D^9$ against the action of spring $D^{10}$. The exhaust port in the cylinder is seen at E while the corresponding port in the sleeve B is not shown in the section as it is turned into an out-of-register position to close the exhaust port as the piston in this view is shown at the beginning of its power stroke position.

Figure 5 is a cross section of the head and upper end of a cylinder of an engine for operating upon the constant volume method according to the invention showing an appropriate type of injection valve arrangement.

The constant volume engine may have a sleeve valve for controlling the exhaust port which may be located in a similar position to the port E seen in Figure 3 or any suitable form of exhaust valve may be employed. An air-cooled cylinder may be provided or the cylinder may be water-cooled as illustrated in Figure 3.

In Figure 5 the combustion agent enters the injection valve device F through the pipe $F^1$ and the fuel passed into the device through the pipe $F^2$. The valve $F^3$ controls fuel ducts $F^4$ in the valve seat and the emission of the combustion agent. The valve is operated against the action of a compression spring $F^5$ by a tappet $F^6$ on a rock shaft $F^7$. The spark plug for igniting the charges may be located in the cylinder head or in the cylinder wall adjacent the head but is not shown in the drawings.

In Figure 6 is diagrammatically illustrated in fragmentary cross section a vaporizer plant adapted for the supply of vaporized combustion agent. A reservoir G for liquid oxygen or oxygen-enriched air supplies the liquid agent to the cylinder of a compression pump H through a pipe $G^1$, the drive for the pump being indicated at I. The pump forces the liquid agent through the pipe $G^2$ into a suitable vaporizer shown in conventional form at J.

The liquid agent reservoir covered by insulation $G^3$ and the pipes $G^1$ and $G^2$ as well as the pump H are embedded in insulating material $G^4$.

The heat exchange coil or element $J^1$ is surrounded by a heating jacket $J^2$ through which is circulated a heating agent via the pipe connections $J^3$ and $J^4$.

Vaporized agent at a predetermined pressure and temperature leaves the coil at $J^5$ and passes to engine inlet pipes such as $D^1$, F (Figures 3 and 5) for admission through the injection valve.

It will be appreciated that according to the substantially incomplete combustion method the residual unburnt gases (i. e., mainly diatomic gases) possess a valuable capacity for doing further work. Accordingly it is proposed to employ the exhaust products as the motive power in a secondary or supplementary engine unit or element or for industrial or chemical purposes. The gaseous exhaust fuel from the primary engine may be used in suitable burners for the generation of steam in any of the known types of gas-fired steam generators, or it may be used as a fuel for a second internal combustion engine, such as a gas engine or compression ignition engine, or for acting upon a trunk piston arrangement in the primary engine, or in a supplementary cylinder in the primary engine block.

In employing a gas engine as the secondary engine the exhaust from the primary engine is employed as combustion fuel for the gas engine. The exhaust gases from the primary engine, although cooler than the exhaust gases from normal internal combustion engines, may be still further cooled by any known means before use in the gas engine. As the exhaust products from the primary engine will always be at a pressure higher than atmospheric pressure, it is possible to supercharge the gas engine cylinder by means of such higher pressure exhaust gases and to utilise the waste power of the primary engine in this way to increase the power output of the secondary engine. According to one method of accomplishing this effect lower pressure atmospheric air is aspirated first and the higher pressure gas from the primary engine is admitted towards the end of the induction stroke. An adequate mixture of gas and air may be effected by the aid of known turbulent methods during part of the induction and the whole of the compression stroke.

According to another method, the higher pressure exhaust products may be employed to induce in a known manner the lower pressure atmospheric air, thus obtaining a mixture of super-atmospheric pressure in delivering the combustion mixture to the engine.

The exhaust gases from the primary engine may be used in a secondary engine of the compression-ignition type operating on the four- or two-stroke cycle. In a four-stroke engine the exhaust products of the primary engine may be admitted during the induction stroke (without addition of combustion air). The exhaust fuel is compressed on the compression stroke and towards the end of this stroke oxygen or oxygen-enriched air generated from a liquid source in a similar manner to that described above is utilised as the combustion agent, being injected into the hot and compressed gas, which is thereby ignited, the ratio of the exhaust gas and the combustion agent being so adjusted that substantially incomplete combustion takes place. If it is desired to reduce the consumption of oxygen mixture a certain amount of air may be admitted during the induction stroke and compressed with the exhaust gases by making use of one of the methods above described in connection with the gas engine. In this case, however, the amount of air admitted is such that no ignition can occur before the oxygen mixture is injected into the cylinder and that complete combustion will not take place.

The exhaust products of the primary engine may also be employed in a secondary engine operating on the ordinary two-stroke cycle, when the exhaust from the primary engine, being at higher pressure than atmospheric, may be used towards the end of the power stroke for induction and scavenging purposes.

This application of the invention is based on the ordinary compression ignition four- and two-stroke cycle as a model, i. e., insofar as the succession of strokes is concerned, but the parts played by the fuel and the combustion air are reversed, the latter and not the fuel being derived from a liquid source and injected into the fuel which is gaseous and is compressed. Otherwise, the known methods of operation developed for the Diesel engine may be applied and known types of valve arrangement, injection nozzle and means of creating turbulence in the cylinder may be employed.

The only differences that require mention are that the combustion agent will be preferably injected (into the fuel) in the gaseous state after having been vaporized under pressure, and that it is practicable to admit part of the oxygen required by mixing atmospheric air (the balance of oxygen being derived from a liquid source as indicated) with the gaseous fuel before compression.

The pressure in the vaporizer has to be higher than the pressure of the gas at the end of the compression stroke. The temperature of the combustion agent may be 50° to 150° C.

The amount of combustion agent which can be admitted before the compression stroke without danger of preignition obviously depends on the inflammability of the gaseous fuel used. For example, if the exhaust gas from the primary engine consisting of carbon monoxide and hydrogen is used, a charge containing up to 20% of air and 80% of gas may be compressed. After injecting oxygen a combustion gas may be obtained containing about 33% carbon dioxide and steam, and 67% diatomic gases, at about the same combustion temperature as in the present-day engine. In this particular case 28% of the oxygen would be supplied as air.

It will be appreciated that instead of employing exhaust products from the primary engine equivalent gases (as for example water gas, town gas, coke oven gas, and natural or oil gas) from industrial or other sources may be employed in conjunction with injected oxygen or oxygen-enriched air generated from the liquid source in the manner above indicated.

I claim:

1. In internal combustion engine operation, vaporizing a liquefied gas comprising upwards of about 30% free oxygen as a combustion agent, admitting fuel under pressure to a cylinder of the engine and admitting the vaporized combustion agent under pressure to the engine cylinder in an amount in relation to the fuel which on ignition effects substantially incomplete combustion producing as exhaust products mainly the diatomic gases carbon monoxide and hydrogen instead of the normal products of combustion of an internal combustion engine.

2. In internal combustion engine operation, vaporizing a liquefied gas comprising upwards of about 30% free oxygen as a combustion agent, admitting fuel under pressure to a cylinder of the engine and admitting the vaporized combustion agent under pressure to the engine cylinder in an amount in relation to the fuel which on ignition effects substantially incomplete combustion producing as exhaust products mainly the diatomic gases carbon monoxide and hydrogen instead of the normal products of combustion of an internal combustion engine, the said fuel and agent being admitted under pressure and temperature conditions such that ignition takes place on injection.

3. In internal combustion engine operation, vaporizing a liquefied gas comprising upwards of about 30% free oxygen as a combustion agent, admitting fuel under pressure to a cylinder of the engine and admitting the vaporized combustion agent under pressure to the engine cylinder in an amount in relation to the fuel which on ignition effects substantially incomplete combustion producing as exhaust products mainly the diatomic gases carbon monoxide and hydrogen instead of the normal products of combustion of an internal combustion engine, the said fuel and agent being admitted under pressure and temperature conditions such that ignition does not take place on injection but is effected by an applied spark.

4. In internal combustion engine operation, vaporizing a liquefied gas comprising upwards of about 30% free oxygen for use as a combustion agent, admitting fuel under pressure to a cylinder of the engine and admitting the vaporized combustion agent under pressure to the engine cylinder when the piston towards the end of its stroke is close to the cylinder head in a cycle consisting of alternating power and exhaust strokes, the combustion agent being admitted in amounts in relation to the fuel which on ignition effect substantially incomplete combustion producing as exhaust products mainly the diatomic gases carbon monoxide and hydrogen instead of the normal products of combustion of an internal combustion engine.

5. In internal combustion engine operation as claimed in claim 4, closing the exhaust port at a predetermined angle before top dead centre to recompress a part of the diatomic exhaust products to effect the ignition of the incoming fresh charge of fuel and vaporized combustion agent.

6. In internal combustion engine operation as claimed in claim 1, admitting gaseous fuel into a cylinder of the engine and injecting the vaporized combustion agent towards the end of the compression stroke of a four-stroke engine cycle.

7. In internal combustion engine operation as claimed in claim 1 and according to the ordinary two-stroke cycle, admitting gaseous fuel into a cylinder of the engine towards the end of the power stroke thereby expelling the combustion products, compressing the gaseous fuel on the following instroke and injecting the vaporized combustion agent towards the end of compression in the two-stroke cycle.

8. The operation of an internal combustion engine as claimed in claim 1 and according to the four-stroke cycle wherein gaseous fuel comprising industrial gases is admitted during the suction stroke and the said vaporized combustion agent is injected in the amount specified in the said claim, towards the end of the compression stroke.

9. The operation of an internal combustion engine as claimed in claim 1 and according to the ordinary two-stroke cycle wherein gaseous fuel comprising industrial gases is admitted towards the end of the power stroke and the said vaporized combustion agent is injected in the amount specified in the said claim, towards the end of compression.

10. An internal combustion engine installation having a vaporizer for liquefied gas comprising upwards of about 30% free oxygen for use as a combustion agent in the engine, a pump delivering the liquefied gas to the vaporizer under pressure, means for admitting fuel and admitting vaporized agent under pressure to a cylinder of the engine in relative amounts which on ignition effect substantially incomplete combustion producing as exhaust products mainly the diatomic gases carbon monoxide and hydrogen instead of the normal products of combustion of an internal combustion engine.

11. An internal combustion engine installation as claimed in claim 10 and wherein fuel and vaporized combustion agent inlet means are located to admit the said fuel and the said agent to the cylinder head end of the cylinder and the cylinder has its exhaust valve located towards the cylinder head end of the cylinder and wherein actuating means are provided for operating the said inlet means and said exhaust valve on a two-stroke cycle consisting of alternating power and exhaust strokes, the inlet taking place from the vaporizer pressure source when the piston is close to the cylinder head end of the stroke while exhaust is effected during the major part of the stroke of the piston towards the cylinder head.

HANS REINHARD FEHLING.